United States Patent [19]
Shiraki

[11] Patent Number: 6,028,556
[45] Date of Patent: Feb. 22, 2000

[54] PORTABLE RADIO COMMUNICATION APPARATUS

[75] Inventor: Manabu Shiraki, Yamato, Japan

[73] Assignee: Shicoh Engineering Company, Ltd., Kanagawa Prefecture, Japan

[21] Appl. No.: 09/210,898

[22] Filed: Dec. 16, 1998

[30] Foreign Application Priority Data

Jul. 8, 1998 [JP] Japan .................................. 10-208659

[51] Int. Cl.⁷ .............................. H01Q 1/24; H01Q 1/36
[52] U.S. Cl. ............................. 343/702; 343/895; 455/90
[58] Field of Search ..................................... 343/702, 895; 455/90; H01Q 1/24, 1/36

[56] References Cited

U.S. PATENT DOCUMENTS 5,812,093  9/1998  Thompson et al. ..................... 343/895
5,905,475  5/1999  Annamaa ................................ 343/895

*Primary Examiner*—Don Wong
*Assistant Examiner*—Hoang Nguyen
*Attorney, Agent, or Firm*—Wenderoth, Lind & Ponack, L.L.P.

[57] ABSTRACT

A portable radio communication apparatus of the present invention comprises a main body having an operation section, a microphone, a speaker, an antenna portion, wherein the speaker is built in the main body, the antenna portion has a top end portion projected to the outside of said main body, the top end portion has a helical antenna, and the microphone is provided in an air-core of the helical antenna. At a telephone conversation, the speaker provided in the main body is set to an ear, and the microphone built in the antenna top end portion is put close to a mouth.

10 Claims, 7 Drawing Sheets

PORTABLE RADIO COMMUNICATION APPARATUS

BACKGROUND OF THE INVENTION

The present invention relates to a portable radio communication apparatus such as a Personal Handyphone System (PHS) and a portable telephone.

Generally, in the portable radio communication apparatus such as a PHS, and a portable telephone, a speaker and a microphone are built in a main body of the portable radio communication apparatus. At the time of using such an apparatus, a user takes the main body in a user's hand and puts it close to a user's cheek. Then, the speaker is directed to a user's ear, and the microphone is directed to the user's mouth.

In this type of portable radio communication apparatus, the miniaturization has been conventionally advanced according to the user demands, and packing density of the interior of the main body of the portable radio communication apparatus has been increased in accordance with the miniaturization.

In recent years, the users demands for miniaturization of the portable radio communication apparatus have been more increased. If the miniaturization of the portable radio communication apparatus is increased more than now, the distance between the user's mouth and the microphone built in the main body of the portable radio communication apparatus becomes short. As a result, the user must speak with a louder voice than the surrounding noise during a telephone conversation. Also, the distance between the user's ear and the speaker becomes short, the speaker sound of the portable radio communication apparatus becomes hard to hear. Thus, in the conventional portable radio communication apparatus, further miniaturization brings about a disadvantage in which the functions, which the portable radio apparatus has, are deteriorated.

Moreover, the speaker and the microphone are indispensable for the telephone conversation and a space for having them built-in must be preserved. Therefore, there was a limitation in the miniaturization.

SUMMARY OF THE INVENTION

An object of the present invention is to provide a portable radio communication apparatus, which can prevent the deterioration of the functions, and which can improve the miniaturization.

According to a first aspect of the present invention, there is provided a portable radio communication apparatus comprising a main body having an operation section, a microphone, a speaker, an antenna portion, wherein the speaker is built in the main body, the antenna portion has a top end portion projected to the outside of the main body, the top end portion has a helical antenna, and the microphone is provided in an air-core of the helical antenna.

According to the invention described in claim 1, since the microphone is built in the air-core of the helical antenna positioned at the outside of the main body, parts in the main body can be reduced, and the portable radio communication apparatus can be made smaller. Also, since the top end portion of the microphone is placed at the outside of the main body, the microphone can be easily put close to the user's mouth at a telephone conversation, a voice collecting property can be increased, so that the calling function can be improved. Moreover, since the microphone is provided using a inside space in the antenna portion, the apparatus can be easily manufactured without changing the design in particular.

According to a second aspect of the present invention, there is provided the portable radio communication apparatus wherein the antenna portion has an extendable rod in a direction where the top end portion is stayed away from the main body.

According to the invention described in claim 2, since the rod of the antenna portion is formed to be extendable, the rod can be contained in the main body of the potable radio communication apparatus at a carrying time, the rod is extended such that the top end portion having the microphone built-in is stayed away from the main body at a telephone conversation using the portable radio communication apparatus, and the microphone built in the antenna top end portion is put close to a user's mouth so as to speak on the phone.

According to a third aspect of the present invention, there is provided the portable radio communication apparatus wherein the rod is inclined to one side surface of the main body in a state that the rod is contracted and contained in the main body.

According to the invention described in claim 3, since the rod is inclined in the main body, the length for containing can be largely obtained. Therefore, even if the size of the main body is small, the antenna portion can be largely extended.

According to a fourth aspect of the present invention, there is provided the portable radio communication apparatus wherein the rod forms an angle to the main body in a state that the rod is extended.

According to the invention described in claim 4, the rod forms an angle to the main body in a state that the rod is extended. When the speaker provided in the main body is set to the user's ear and the main body is placed to the user's cheek, the microphone at the top end of the antenna portion can be put close to the mouth. Therefore, the user's voice can be easily collected from the microphone, and the calling function can be further improved.

According to a fifth aspect of the present invention, there is provided the portable radio communication apparatus wherein the rod is formed of a flexible material.

According to the invention described in claim 5, since the rod is formed to be flexible, the microphone can be adjusted to a suitable position close to the mouth at the telephone conversation. In other words, even when the distance between the ear and the mouth are different like in the case of the adult and the child, the distance can be suitably and easily adjusted in accordance with the user.

According to a sixth aspect of the present invention, there is provided a portable radio communication apparatus comprising a main body having an operation section, a microphone, a speaker, an antenna portion, wherein the microphone is built in the main body, the antenna portion has a top end portion projected to the outside of the main body, the top end portion has a helical antenna, and the speaker is provided in an air-core of the helical antenna.

According to the invention described in claim 6, since a speaker is built in an air-core of a helical antenna positioned at the outside of a main body, parts in the main body can be reduced, and the portable radio communication apparatus can be made smaller. Also, since the top end portion of the speaker is placed at the outside of the main body, the speaker can be easily put close to the user's ear at a telephone conversation, hearing can be easily made, so that the calling function can be improved. Moreover, since the speaker is provided using a space in the antenna portion, the apparatus can be easily manufactured without changing the design in particular.

According to a seventh aspect of the present invention, there is provided the portable radio communication apparatus wherein the antenna portion has an extendable rod in a direction where the top end portion is stayed away from the main body.

According to the invention described in claim 7, since the rod of the antenna portion is formed to be extendable the rod can be contained in the main body of the potable radio communication apparatus at a carrying time, the rod is extended such that the top end portion having the speaker built-in is separated from the main body at a telephone conversation using the portable radio communication apparatus, and the speaker built in the antenna top end portion is put close to a user's mouth so as to speak on the phone.

According to an eighth aspect of the present invention, there is provided the portable radio communication apparatus wherein the rod is incline to one side surface of the main body in a state that the rod is contracted and contained in the main body.

According to the invention described in claim 8, since the rod is inclined in the main body, the length for containing can be largely obtained. Therefore, even if the size of the main body is small, the antenna portion can be largely extended.

According to a ninth aspect of the present invention, there is provided the portable radio communication apparatus wherein the rod forms an angle to the main body in a state that the rod is extended.

According to the invention described in claim 9, the rod forms an angle to the main body in a state that the rod is extended. When the microphone provided in the main body is put close to mouth and the main body is placed to the user's cheek, the speaker at the top end of the antenna portion can be put close to the ear. Therefore, the call sound can be easily heard from the speaker, and the calling function can be further improved.

According to a tenth aspect of the present invention, there is provided the portable radio communication apparatus wherein the rod is formed of a flexible material.

According to the invention described in claim 10, since the rod is formed to be flexible, the speaker can be adjusted to a suitable position close to the ear at the telephone conversation. In other words, even when the distance between the ear and the mouth are different like in the case of the adult and the child, the distance can be suitably and easily adjusted in accordance with the user.

DETAILED DESCRIPTION OF THE PREFERRED EMBODIMENTS

Figure 1:
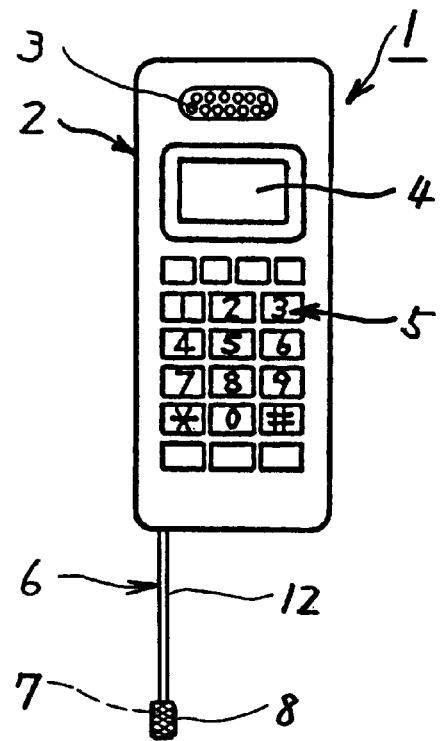
FIG. 1 is a front view showing an extended state of an antenna portion of a portable radio communication apparatus of a first embodiment of the present invention.

The following will specifically explain the embodiments of the present invention with reference to the accompanying FIGS. 1 to 14. First, a portable radio communication apparatus 1 of the first embodiment of the present invention will be described with reference to FIGS. 1 to 3.

The portable radio communication apparatus 1 of the first embodiment of the present invention mainly comprises a main body 2 of the portable radio communication apparatus containing an electric circuit for the portable radio communication apparatus 1, a speaker 3, a display portion 4 such as a liquid crystal display, an operation section 5 for operating the portable radio communication apparatus 1 using a plurality of dial buttons and operation buttons, an antenna portion 6 used for receiving radio waves, and a microphone 7.

Figure 2:
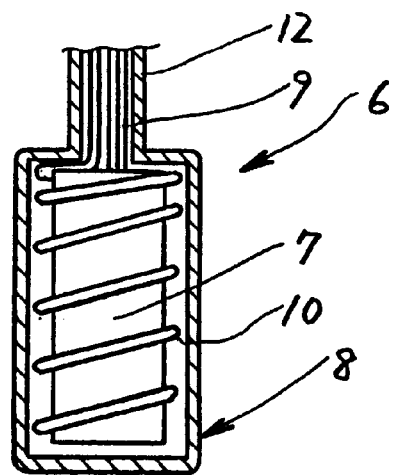
FIG. 2 is a cross-sectional view of the antenna portion of the first embodiment of the present invention.

The antenna portion 6 generally comprises a rod 12 having a base end portion fixed to the main body 2 and a top, end portion extendable to the main body 2, an antenna top portion 8, and the microphone 7 built in the antenna top portion 8. The rod 12 is contracted and contained in the main body 2 at an apparatus non-using state. At an apparatus using state, the rod 12 is extended to the outside of the main body 2 as shown in FIG. 1.

The microphone 7 is built in the top portion 8 of the antenna portion 6. In other words, as shown in the enlarged view of FIG. 2, the top portion 8 is cylindrically formed to have an outside diameter thicker than the rod 12. Then, a helical antenna 10 is built in an inner side of the cylinder. In the helical antenna 10, a linear conductive material is helically formed to have a hollow therein, and one end of the antenna 10 is electrically made contact with the main body via the rod 12 so as to receive communication radio waves.

The microphone 7 is built in an air-core formed in the helical antenna 10. The microphone 7 is a general microphone and is not particularly limited. On the other hand, on an outer wall portion forming the top portion 8, a large amount of holes is formed such that vibrations in the air are easily transmitted to the microphone 7.

Lead lines 9 are electrically connected to the microphone 7. The lead lines 9 are in contact with an electrical circuit (not shown) of the main body 2 through the flexible rod 12. The microphone 7 is thus built in the aircore of the helical antenna 10. This eliminates the need for changing the design of the antenna portion 6 in particular. Then, the miniaturization of the apparatus can be improved with an effective use of the space of the helical antenna 10. Also, since the formation of the microphone 7 in the antenna portion 6 can reduce the number of parts in the main body 2, the main body 2 itself can be made smaller.

Figure 3:
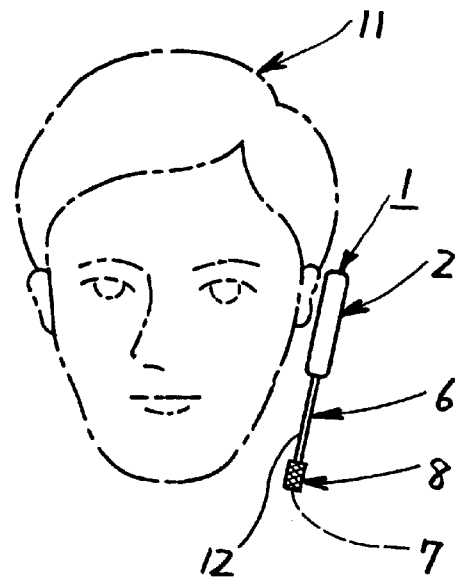
FIG. 3 is a view showing a using state of the portable radio communication apparatus of the first embodiment of the present invention.

FIG. 3 shows the using state (telephone call state) of the portable radio communication apparatus 1 of the first embodiment of the present invention. As shown in this figure, the user sets the speaker 3 of the main body 2 to the user's ear, expands the antenna portion 6, and puts the antenna distal portion 8 close to the user's mouth. Since the microphone 7 is provided in the antenna top portion 8, the user's voice is collected by the microphone contained in the antenna top portion 8 during a telephone conversation. Therefore, the microphone 7 can be put close to the user's mouth. This increases a voice collecting property, and improves the calling function of the portable radio communication apparatus 1. Also, the user can sufficiently hear a calling sound from the speaker 3 set to the ear.

Figure 4:
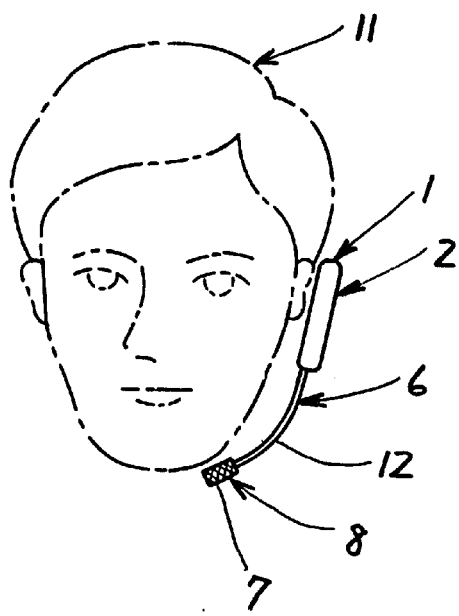
FIG. 4 is a view showing a using state of the portable radio communication apparatus of a second embodiment of the present invention.

Next, the portable radio communication apparatus 1 of the second embodiment of the present invention will be described with reference to FIG. 4. In the other embodiments to be explained below, the same reference numerals are added to the portions having the same technical advantages as the first embodiment, and the explanation will be omitted.

The portable radio communication apparatus 1 of the second embodiment is different from the first embodiment in the point that the antenna portion 6 can be appropriately bent when a user 11 extends the antenna portion 6 as required. The other structure is substantially the same as the first embodiment.

More specifically, in the second embodiment, the rod 12 of the antenna portion 6 is formed of a flexible material such as soft synthetic resin. The rod 12 may be formed of plural cylindrical metals, which are connected to each other, which is possible to be bent. In the second embodiment, the user puts the speaker 3 close to the user's ear. Then, the user can bend the rod 12 in its extended state, and can put the antenna top portion 8 closer to the mouth. This increases the voice collecting property more so as to improve the calling function of the apparatus. Particularly, it is possible to individually adjust the antenna portion 6 in accordance with the positions of the contour of the user's face, the ear, and the mouth even if the user is the adult or the child, or the man or the woman. Thus, the antenna portion 6 can be individually adjusted in accordance with the user. This improves the calling function of the portable radio communication apparatus 1.

Figure 5:
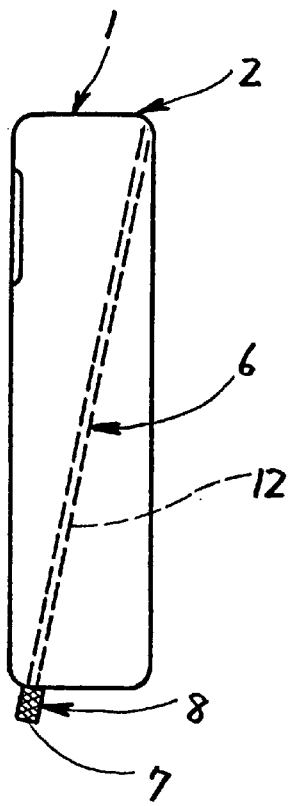
FIG. 5 is a view showing the portable radio communication apparatus of a third embodiment of the present invention, and a state in which the antenna portion is contained in a main body of the portable radio communication apparatus.

Next, the portable radio communication apparatus 1 of the third embodiment of the present invention will be described with reference to FIGS. 5 and 6. As shown in FIG. 5, the portable radio communication apparatus 1 of the third embodiment of the present invention is diagonally contained in the box-shaped main body 2 of substantially a rectangle. More specifically, the rod 12 of the antenna portion 6 is diagonally placed from the surface side, serving as the operation section 5 of the main body 2, to the rear face side opposite thereto and from the lower portion to the upper portion in FIG. 5. The rod 12 is structured to be extended downward from the main body 2. The arranging space can be largely obtained by thus placing the rod 12 in the box-shaped main body 2 diagonally. In other words, the length of the rod 12 can be increased by diagonally containing the rod 12 in the main body 2. Therefore, when the rod 12 is expanded, the top portion 8 having the microphone 7 built-in can be easily put close to the user's mouth. Moreover, by diagonally containing the rod 12 in the main body 2, the rod 12 forms a predetermined angle to the main body 2 when the rod 12 is extended. As a result, the user 11 can easily put the microphone 7 close to the mouth.

Figure 6:
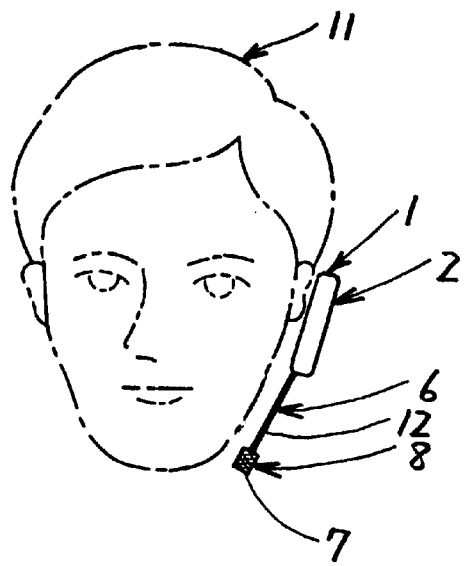
FIG. 6 is a view showing a using state of the portable radio communication apparatus of FIG. 5.

FIG. 6 shows a state in which the user 11 uses the portable radio communication apparatus 1 of the third embodiment of the present invention. As shown in FIG. 6, when the user 11 extends the antenna portion 6 as required, the antenna portion 6 extends straightly as maintaining the suitable angle to the main body 2 of the portable radio communication apparatus 1. When the user puts the speaker 3 close to the ear, the microphone 7 is placed close to the user's mouth. This increases the voice collecting property of the portable radio communication apparatus 1 so as to improve the calling function.

Figure 7:
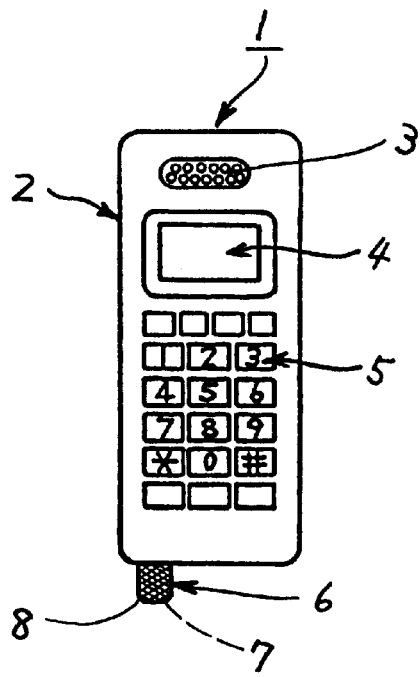
FIG. 7 is a front view of the portable radio communication apparatus of a fourth embodiment of the present invention.

Next, the following will explain the portable radio communication apparatus 1 of the fourth embodiment of the present invention with reference to FIG. 7.

In this embodiment, unlike the first to third embodiments, the antenna portion 6 does not have the expandable rod 12. More specifically, the antenna portion 6 is fixed to the main body 2, and cannot be extended. Then, the top portion 8 is formed on the main body 2 to be projected therefrom. In this embodiment, since the antenna portion 6 cannot be extended, the top portion 8 having the microphone 7 built-in cannot be easily put close to the user's mouth. However, at least the microphone 7 is built in the antenna portion 6, so that the number of parts in the main body 2 of the portable radio communication apparatus 1 can be reduced, and the main body 2 can be made smaller.

Figure 8:
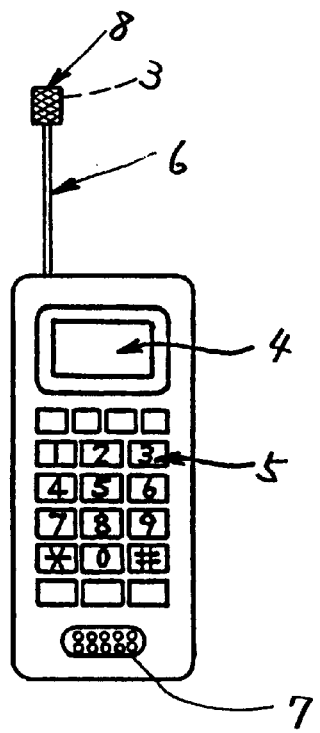
FIG. 8 is a front view of the portable radio communication apparatus of a fifth embodiment of the present invention.
Figure 9:
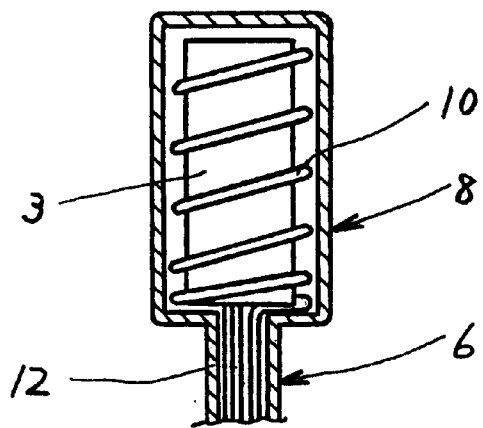
FIG. 9 is a cross-sectional view of the antenna portion of FIG. 8.
Figure 10:
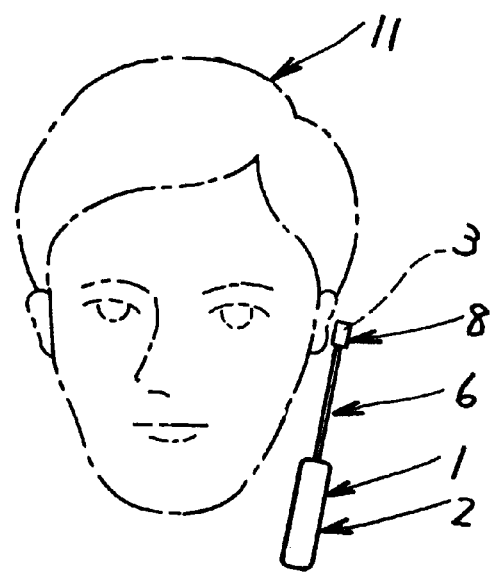
FIG. 10 is a view showing a using state of the portable radio communication apparatus of FIG. 8.

Next, the following will explain the portable radio communication apparatus 1 of the fifth embodiment of the present invention with reference to FIGS. 8 to 10. Unlike the first to fourth embodiments, according to the portable radio communication apparatus 1 of the fifth embodiment, the speaker 3 is built in the antenna distal portion 8. Also, the antenna portion 6 comprises the extendable rod 12. The rod 12 is extended to the outside of the main body 2 of the portable radio communication apparatus 1 when using. At the time of using the apparatus, the user 11 sets the antenna top portion 8 to the user's ear.

The microphone 7, the display section 5, and the operation section 5 are built in the main body 2 of the portable radio communication apparatus 1. Note that the speaker 3 may be used as a part of an earphone. In this case, it is preferable that the speaker 3 should have a shape and a size such that the antenna top portion 8 can be put into the ear.

FIG. 9 is a cross-sectional view showing an enlarged antenna portion 6. The speaker 3 is provided in the air-core of the helical antenna 10 built in the antenna top portion 8.

Lead lines 12 of the speaker 3 are electrically connected to an electrical circuit (not shown) of the main body 2 through the flexible rod 12. The speaker 3 is thus built in the air-core of the helical antenna 10. This eliminates the need for changing the design of the antenna portion 6 in particular. Also, since the formation of the speaker 3 in the antenna portion 6 can reduce the number of parts in the main body 2, the main body 2 itself can be made smaller.

FIG. 10 is a view showing a state in which the user 11 is speaking on the phone according to the fifth embodiment. As shown in FIG. 10, in this embodiment, since the speaker 3 is provided in the antenna top portion 8, the speaker 3 can be put close to the user's ear during a telephone conversation. As a result, the sound from the speaker 3 can be easily heard, and the calling function of the apparatus can be improved.

Figure 11:
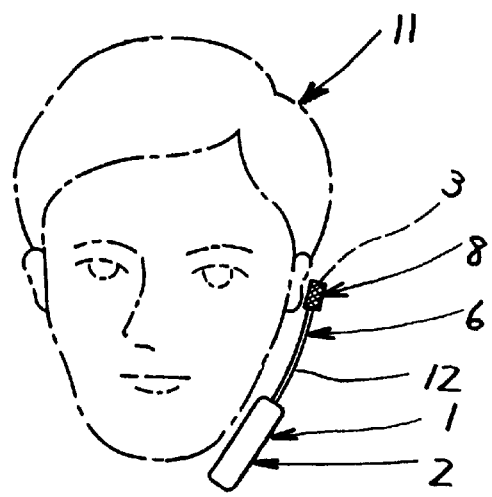
FIG. 11 is a view showing a using state of the portable radio communication apparatus of a sixth embodiment of the present invention.

Next, the following will explain the sixth embodiment of the present invention with reference to FIG. 11. The structure of the portable radio communication apparatus 1 of the sixth embodiment is substantially the same as that of the fifth embodiment. The difference therebetween is that the antenna portion 6 is made of the rod 12 formed of an appropriately flexible material. The rod 12 is thus structured to be flexible. As a result, the speaker 3 can be put close to the user's ear when the user places the microphone 7 close to the mouth, and the sound from the speaker 3 can be easily heard, so that the calling function of the apparatus can be improved.

Figure 12:
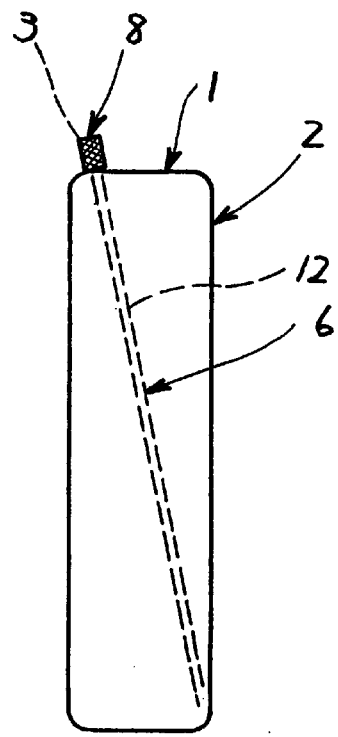
FIG. 12 is a view showing the portable radio communication apparatus of a seventh embodiment of the present invention, and a state in which the antenna portion is contained in a main body of the portable radio communication apparatus.
Figure 13:
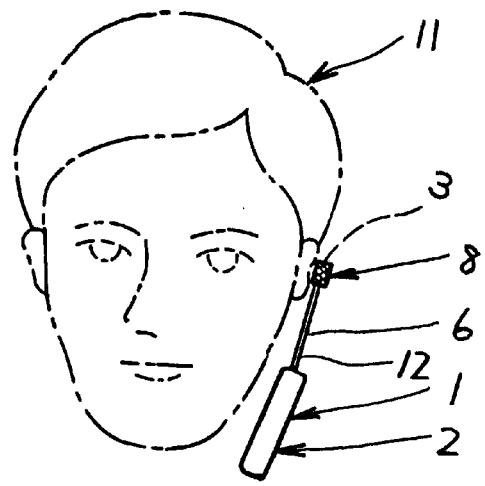
FIG. 13 is a view showing a using state of the portable radio communication apparatus of the seventh embodiment of the present invention.

Next, the following will explain the portable radio communication apparatus 1 of the seventh embodiment of the present invention with reference to FIGS. 12 and 13. In the portable radio communication apparatus 1 of the seventh embodiment is structured as follows:

Specifically, the antenna portion 6 is diagonally contained in the box-shaped main body 2 of substantially a rectangle from the surface side, serving as the operation section 5 of the main body 2, to the rear face side opposite thereto and from the lower portion to the upper portion in FIG. 12. The rod 12 is structured to be extended upward from the main body 2. The arranging space can be largely obtained by thus placing the rod 12 in the box-shaped main body 2 diagonally. In other words, the length of the rod 12 can be increased by diagonally containing the rod 12 in the main body 2. Therefore, when the rod 12 is expanded, the top portion 8 having the speaker 3 built-in can be easily put close to the user's ear. Moreover, by diagonally containing the rod 12 in the main body 2, the rod 12 forms a predetermined angle to the main body 2 when the rod 12 is extended, so that the user 11 can easily put the speaker 3 close to the ear.

In other words, when the user 11 extends the antenna portion 6 as required, the antenna portion 6 extends straightly as maintaining the suitable angle to the main body 2 of the portable radio communication apparatus 1. When the user 11 puts the microphone 7 close to the mouth, the speaker 3 is placed close to the user's ear, so that the sound of the speaker 3 of the portable radio communication apparatus 1 can be easily heard, and the calling function of the apparatus can be improved.

Figure 14:
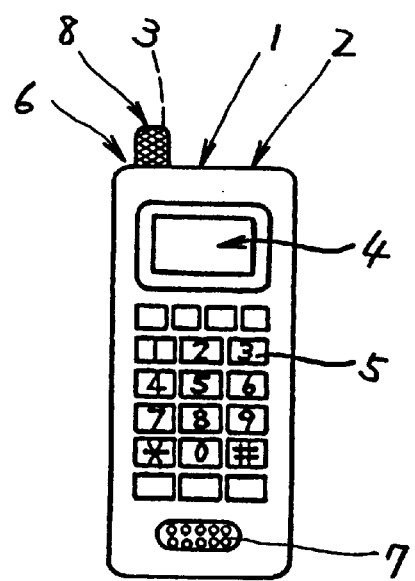
FIG. 14 is a front view of the portable radio communication apparatus of an eighth embodiment of the present invention.

Next, the following will explain the portable radio communication apparatus 1 of the eighth embodiment of the present invention with reference to FIG. 14.

In the portable radio communication apparatus 1 of the eighth embodiment, the antenna portion 6 is formed on the main body 2 to be projected therefrom, and the speaker 3 is built in the top portion 8 of the antenna portion 6. This can reduce the number of parts in the main body 2 of the portable radio communication apparatus 1 can be reduced even in this embodiment, so that the main body 2 can be made smaller.

What is claimed is:

1. A portable radio communication apparatus comprising a main body having an operation section, a microphone, a speaker, an antenna portion, wherein said speaker is built in said main body, said antenna portion has a distal end portion projected to the outside of said main body, the distal end portion has a helical antenna, and said microphone is provided in an air-core of the helical antenna.

2. The portable radio communication apparatus according to claim 1, wherein said antenna portion has an extendable rod in a direction where said distal end portion is stayed away from said main body.

3. The portable radio communication apparatus according to claim 2, wherein said rod is inclined to a one side surface of said main body in a state that said rod is contracted and contained in said main body.

4. The portable radio communication apparatus according to claim 2, wherein said rod forms an angle to said main body in a state that said rod is extended.

5. The portable radio communication apparatus according to claim 4, wherein said rod is formed of a flexible material.

6. A portable radio communication apparatus comprising a main body having an operation section, a microphone, a speaker, an antenna portion, wherein said microphone is built in said main body, said antenna portion has a distal end portion projected to the outside of said main body, the distal end portion has a helical antenna, and said speaker is provided in an air-core of the helical antenna.

7. The portable radio communication apparatus according to claim 6, wherein said antenna portion has an extendable rod in a direction where said distal end portion is separated from said main body.

8. The portable radio communication apparatus according to claim 7, wherein said rod is inclined to one side surface of said main body in a state that said rod is contracted and contained in said main body.

9. The portable radio communication apparatus according to claim 7, wherein said rod forms an angle to said main body in a state that said rod is extended.

10. The portable radio communication apparatus according to claim 9, wherein said rod is formed of a flexible material.

* * * * *